US005737760A

United States Patent [19]
Grimmer, Jr. et al.

[11] Patent Number: 5,737,760
[45] Date of Patent: Apr. 7, 1998

[54] MICROCONTROLLER WITH SECURITY LOGIC CIRCUIT WHICH PREVENTS READING OF INTERNAL MEMORY BY EXTERNAL PROGRAM

[75] Inventors: George G. Grimmer, Jr.; Michael W. Rhoades, both of Austin, Tex.

[73] Assignee: Motorola Inc., Schaumburg, Ill.

[21] Appl. No.: 539,979

[22] Filed: Oct. 6, 1995

[51] Int. Cl.$^6$ .................................................. G06F 12/14
[52] U.S. Cl. .......................... 711/163; 395/186; 395/490
[58] Field of Search .......................... 395/186, 188.01, 395/427, 490, 491, 492, 493, 187.01, 187.02, 182.06, 185.06; 711/163

[56] References Cited

U.S. PATENT DOCUMENTS

| | | | |
|---|---|---|---|
| 4,211,919 | 7/1980 | Ugon | 235/487 |
| 4,499,556 | 2/1985 | Halpern | 395/186 |
| 4,521,853 | 6/1985 | Guttag | 395/490 |
| 4,590,552 | 5/1986 | Guttag et al. | 395/490 |
| 4,698,750 | 10/1987 | Wilkie et al. | 395/490 |
| 4,958,276 | 9/1990 | Kjuchi et al. | 364/200 |
| 5,012,410 | 4/1991 | Ueda | 364/200 |
| 5,014,191 | 5/1991 | Padgaonkar et al. | 395/490 |
| 5,067,077 | 11/1991 | Wakimoto et al. | 395/400 |
| 5,134,700 | 7/1992 | Eyer et al. | 395/425 |
| 5,168,559 | 12/1992 | Tamura | 395/425 |
| 5,210,841 | 5/1993 | Johnson | 395/400 |
| 5,247,621 | 9/1993 | Gulick | 395/325 |
| 5,251,304 | 10/1993 | Sibigtroth et al. | 395/490 |
| 5,278,962 | 1/1994 | Masuda et al. | 395/400 |
| 5,305,460 | 4/1994 | Kaneko | 395/775 |
| 5,355,466 | 10/1994 | Iwamoto | 395/288 |
| 5,379,443 | 1/1995 | Margulis | 395/800 |
| 5,396,609 | 3/1995 | Schmidt et al. | 395/490 |
| 5,404,450 | 4/1995 | Szczepanek et al. | 395/200.1 |
| 5,404,547 | 4/1995 | Diamantstein et al. | 395/775 |
| 5,432,950 | 7/1995 | Sibigrroth | 395/490 |
| 5,446,864 | 8/1995 | Burghardt et al. | 395/427 |
| 5,557,743 | 9/1996 | Pombo et al. | 395/186 |
| 5,581,763 | 12/1996 | Hait | 395/186 |

OTHER PUBLICATIONS

Yoshihishi Yamamoto, "On–Board Rewriting Circuit for Rewritable Memory," Jan. 21, 1994, 06–12321, —Abstract.
Shinichi Tamura, "Memory Card Incorporating Microprocessor," Aug. 31, 1990, 02–219149, —Abstract.
Kazuo Fujimoto, "IC Card," Apr. 6, 1988, 63–76095, —Abstract.
Kazunori Nomoto, "Memory Spatial Expansion Circuit for Microprocessor," Feb. 26, 1993, —Abstract.
Harutaka Goto, "Microprocessor," Jun. 10, 1991, 03–135641, —Abstract.
Shigeo Mukai, "Microprocessor," Jul. 7, 1988, 63–163929, G06F 9/38—Abstract.
Yutaka Miyagi, "Printing Apparatus," Feb. 22, 1988, 63–41163, —Abstract.
Makoto Kubo, "Control Processing System for Character Pattern," Mar. 15, 1982, 57–45636, —Abstract.
Kenji Katou, "Microprocessor Incorporating Memory," Jul. 30, 1981, 56–94451, —Abstract.

*Primary Examiner*—Meng-Ai T. An
*Attorney, Agent, or Firm*—Paul J. Polansky

[57] ABSTRACT

A microcontroller (20) provides security for internal instructions and data while allowing instruction fetches to external, off-chip memory connected to an expansion bus (30). A central processing unit (CPU) (21) provides a load instruction register signal to indicate when an access is an instruction fetch. When the load instruction register signal is active while the address is within the range of an on-chip nonvolatile memory (25), a security logic circuit (40) is reset to a first state. In this first state, the security logic circuit (40) also allows non-instruction fetches from the nonvolatile memory (25). However when the load instruction register signal is active while the address is not within the range of the nonvolatile memory (25), the security logic circuit (40) is set to a second state. While in this second state, the security logic circuit (40) disables attempted accesses to the nonvolatile memory (25). The security feature is selectively enabled or disabled as determined by a configuration register (23).

17 Claims, 2 Drawing Sheets

MICROCONTROLLER WITH SECURITY LOGIC CIRCUIT WHICH PREVENTS READING OF INTERNAL MEMORY BY EXTERNAL PROGRAM

CROSS REFERENCE TO RELATED, COPENDING APPLICATION

Related subject matter is contained in copending patent application attorney docket no. CE01113R, Ser. No. 08/539, 914, entitled "Microprocessor Which Limits Access to Internal Memory," invented by Donald A. Dorsey and Joseph M. Hansen, filed of even date herewith, and assigned to the assignee hereof.

FIELD OF THE INVENTION

This invention relates generally to data processors, and more particularly, to security features for data processors.

BACKGROUND OF THE INVENTION

Microcontrollers are integrated circuits which incorporate on-chip several of the elements associated with computer systems including a central processing unit (CPU), volatile and nonvolatile memory, and peripherals. The nonvolatile memory is used to store the operating program for the CPU. Often, the on-chip nonvolatile memory is large enough to incorporate all of the microcontroller's program. In this case, the microcontroller need not access off-chip memory to operate. Occasionally the program is too large to fit in the on-chip nonvolatile memory and the microcontroller must be able to fetch part of the program off-chip. To allow for this possibility, typical microcontrollers have what is known as an expansion bus, that is a connection to an external bus to memory or memory-mapped peripherals through a general-purpose input/output port.

It is often desirable to have security features built into the microcontroller to prevent "hackers" from gaining knowledge of the on-chip program. For example, U.S. Pat. No. 4,698,750 invented by Wilkie et al. and assigned to the assignee hereof teaches a microcomputer with a security mode which when entered prevents the contents of nonvolatile memory from being read by an external source. Another technique taught by Sibigtroth et al. in U.S. Pat. No. 5,251,304 and assigned to the assignee hereof is useful when the microcontroller is operating with an expansion bus. U.S. Pat. No. 5,251,304 teaches a microcontroller with a secure mode in which off-chip instruction accesses are disabled. This technique is useful when the on-chip nonvolatile memory is sufficiently large to store all of the operating program. When the operating program is so large that it cannot be stored in a practically-sized on-chip nonvolatile memory, however, a new problem results. For example, a hacker could rewrite segments of the external portion of the program to cause the CPU to read out the contents of the internal nonvolatile memory. Thus, a microcontroller with a new security technique is needed. This need is met by the invention disclosed in copending application Ser. No. 08/539,914, and is implemented efficiently in a microcontroller by the invention described herein, and these and other features and advantages will be more clearly understood from the following detailed description taken in conjunction with the accompanying drawings.

DETAILED DESCRIPTION OF A PREFERRED EMBODIMENT

Figure 1:
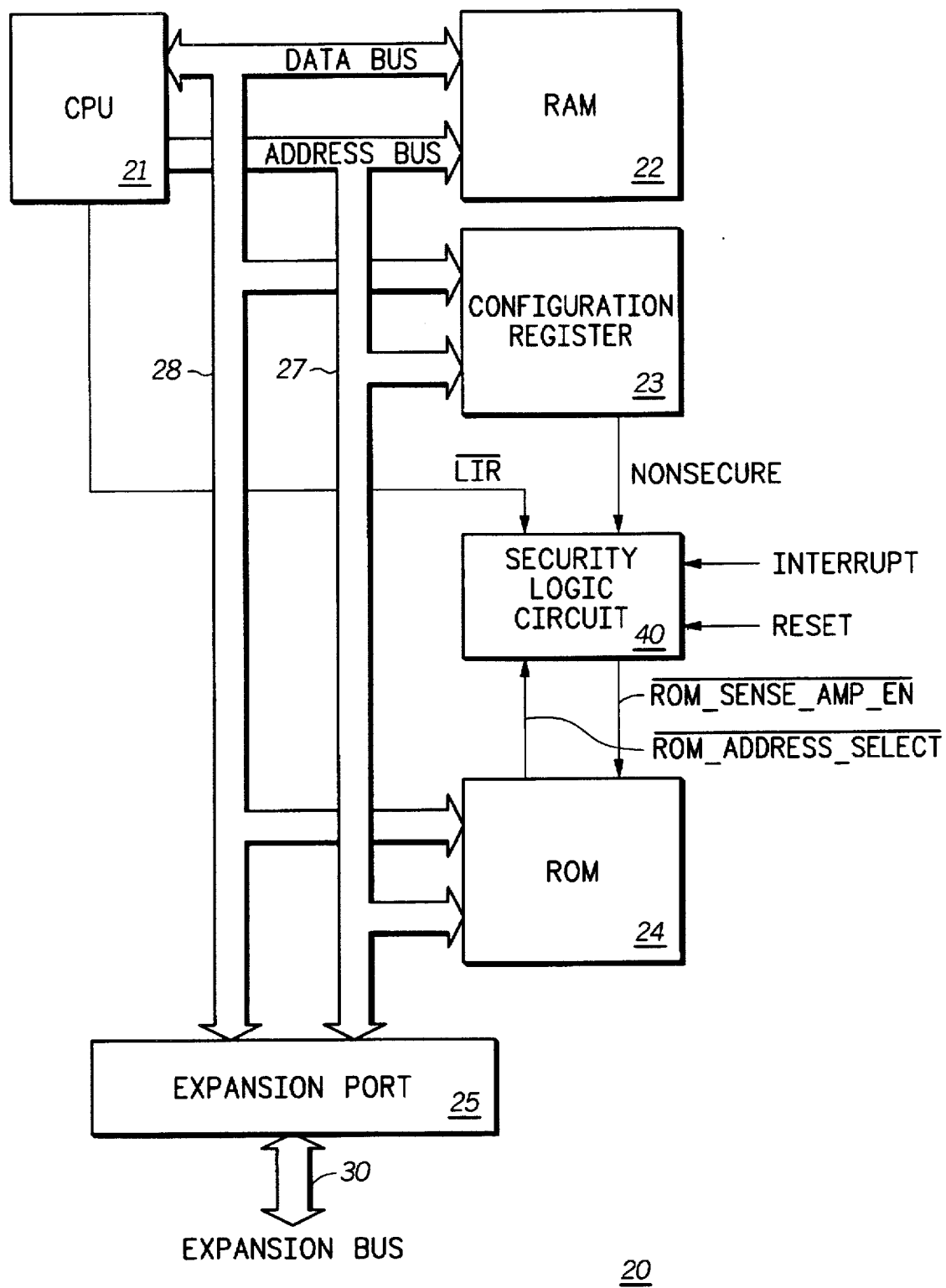
FIG. 1 illustrates in block diagram form a microcontroller according to the present invention.

FIG. 1 illustrates in block diagram form a microcontroller 20 according to the present invention. Microcontroller 20 includes a central processing unit (CPU) 21 which provides address signals to an address bus 27, and conducts data bidirectionally on a data bus 28. Several additional blocks are connected to address bus 27 and data bus 28, including a random access memory (RAM) 22, a configuration register 23, a read-only memory (ROM) 24, and an expansion port 25. The operation of RAM 22 and ROM 24 are generally well-known in the art. Expansion port 25 allows microcontroller 20 to be connected to an external expansion bus 30. One situation in which it would be desirable to connect microcontroller 20 to an expansion bus is the situation in which ROM 24 cannot be practically large enough to store the operating program. For example, ROMs on MCUs are typically limited in size to somewhere in the range of 32–48 kilobytes (Kbytes), whereas some sophisticated application programs can have sizes exceeding 100 Kbytes. These larger-sized programs cannot be practically implemented on-chip using available technology.

Configuration register 23 is implemented in electrically erasable programmable read only memory (EEPROM) and contains several bits associated with the operation of microcontroller 20 including at least one bit which defines a security level. Thus, configuration register 23 functions in part as a security register which defines a nonsecure mode and at least one secure mode for microcontroller 20. When in the nonsecure mode, configuration register 23 activates a signal labelled "NONSECURE", which is otherwise disabled.

In order to allow program accesses to external memory connected to expansion bus 30 while still protecting the integrity of data in ROM 24, microcontroller 20 includes a security logic circuit 40. Security logic circuit 40 receives several control signals and in response selectively enables or disables accesses to ROM 24. When CPU 21 is accessing an instruction, it activates a load instruction register signal labelled "LIR". Conventional microprocessors do not provide signal LIR as an output signal on an integrated circuit pin. However, the LIR signal may be made available when the CPU exists in integrated or "core" form. Security logic circuit 40 also receives signal NONSECURE from configuration register 23. When ROM 24 detects an attempted access within its memory-mapped address range, it activates a signal labelled "ROM ADDRESS SELECT". ROM 24 provides this signal, which is analogous to a chip enable signal, to security logic circuit 40 as well. Finally, security logic circuit 40 also receives a reset signal labelled "RESET" and an interrupt signal labelled "INTERRUPT".

The operation of security logic circuit 40 can be described briefly as follows. When configuration register 23 has not been placed in a secure mode of operation, signal NONSECURE is active. In this case, security logic circuit 40 does not affect accesses to ROM 24, i.e., an external program can access data in ROM 24 and security logic circuit 40 activates signal ROM_SENSE_AMP_EN in response to signal ROM ADDRESS SELECT. When configuration register 23 has been placed in a secure mode of operation, it keeps signal NONSECURE inactive. Then, security logic circuit 40 operates to allow accesses to ROM 24 while CPU 21 is running a program stored in ROM 24, but not while it is running a program stored in a memory connected to expansion bus 30. Security logic circuit 40 accomplishes this function as follows. When security logic circuit 40 detects an instruction access to ROM 24, it is reset to a first state. It detects this type of access when both signal $\overline{LIR}$ and signal $\overline{ROM\ ADDRESS\ SELECT}$ are active at a logic low. This first state allows both instruction and non-instruction accesses to ROM 24. A non-instruction access occurs when the instruction causes a read to ROM 24. Security logic circuit 40 remains in this first state until CPU 21 attempts to read an instruction off-chip, in which case it is set to a second state. It detects this condition when signal $\overline{LIR}$ is active and signal $\overline{ROM\ ADDRESS\ SELECT}$ is inactive. When in the second state, security logic circuit 40 disables non-instruction accesses to ROM 24. Thus, a user who has access to expansion bus 30 cannot supply instructions to CPU 21 which cause it to read the contents of ROM 24.

Security logic circuit 40 receives signals INTERRUPT and RESET so that it is reset to the first state upon encountering these conditions. Thus, the user must ensure that there are no program bugs which would cause the program to jump to an off-chip memory location without setting the security bit or bits in configuration register 23.

By examining signal $\overline{LIR}$, which is a single logic signal available at the boundary of CPU 21 when integrated in core form, security logic circuit 40 is able to easily determine whether an access is to ROM 24 should be allowed. This avoids the need to monitor the internal program counter, which is typically not provided to the periphery of CPU 21, and to perform a multi-bit comparison.

Figure 2:
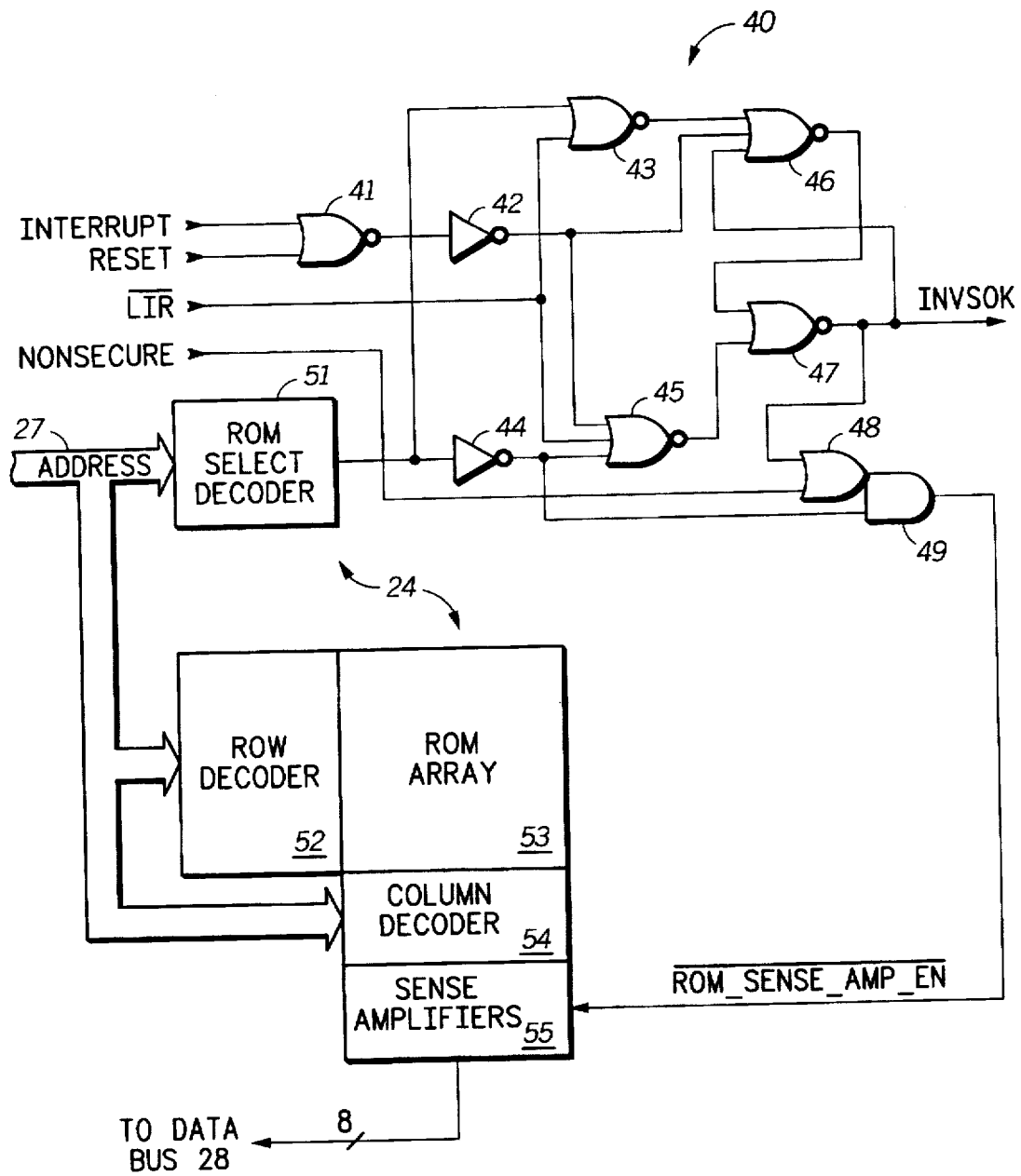
FIG. 2 illustrates in partial block diagram and partial logic diagram form a portion of the microcontroller of FIG. 1 including the security logic circuit.

FIG. 2 illustrates in partial block diagram and partial logic diagram form a portion of microcontroller 20 of FIG. 1 including security logic circuit 40. FIG. 2 also illustrates ROM 24 in greater detail. From FIG. 2, it is seen that ROM 24 includes an ROM select decoder 51, a row decoder 52, an ROM array 53, a column decoder 54, and sense amplifiers 55. ROM select decoder 51 is connected to address bus 27, and compares certain critical bits of the ADDRESS to see if the ADDRESS falls in the range associated with ROM 24. If so, then ROM select decoder 51 activates a signal labelled "$\overline{ROM\ ADDRESS\ SELECT}$". Row decoder 52 is also connected to address bus 27 and decodes selected address bits to select one row in ROM array 53. When the row is selected, ROM memory cells located along the row provide their contents to respective bit lines. Out of all available bit lines, a set is chosen by column decoder 54, which responds to other ADDRESS bits. The set corresponds to the width of data bus 28, but is typically eight bits. Then, sense amplifiers 55 sense the data elements in the memory cells selected by row and column decoding, and provide then to data bus 28. Sense amplifiers 55 are selectively enabled in response to the $\overline{ROM\_SENSE\_AMP\_EN}$ control signal.

Security logic circuit 40 includes a NOR gate 41, an inverter 42, a NOR gate 43, an inverter 44, NOR gates 45–47, an OR gate 48, and a NAND gate 49. NOR gate 41 has a first input terminal for receiving signal INTERRUPT, a second input terminal for receiving signal RESET, and an output terminal. Inverter 42 has an input terminal connected to the output terminal of NOR gate 41, and an output terminal. NOR gate 43 has a first input terminal for receiving signal $\overline{ROM\ ADDRESS\ SELECT}$, a second input terminal for receiving signal $\overline{LIR}$, and an output terminal. Inverter 44 has an input terminal for receiving signal $\overline{ROM\ ADDRESS\ SELECT}$, and an output terminal. NOR gate 45 has a first input terminal connected to the output terminal of inverter 42, a second input terminal for receiving signal $\overline{LIR}$, a third input terminal connected to the output terminal of inverter 44, and an output terminal. NOR gate 46 has a first input terminal connected to the output terminal of NOR gate 43, a second input terminal connected to the output terminal of inverter 42, a third input terminal, and an output terminal. NOR gate 47 has a first input terminal connected to the output terminal of NOR gate 46, a second input terminal connected to the output terminal of NOR gate 45, and an output terminal connected to the third input terminal of NOR gate 46 and providing a signal labelled "INVSOK". OR gate 48 has a first input terminal connected to the output terminal of NOR gate 47, a second input terminal for receiving signal NONSECURE, and an output terminal. NAND gate 49 has a first input terminal connected to the output terminal of OR gate 48, a second input terminal connected to the output terminal of inverter 44, and an output terminal for providing signal $\overline{ROM\_SENSE\_AMP\_EN}$.

Note that when signal NONSECURE is active at a logic high, the output of OR gate 48 is active at a logic high, causing NAND gate 49 to function as an inverter. Thus, signal $\overline{ROM\ ADDRESS\ SELECT}$ is twice inverted and provided as signal $\overline{ROM\_SENSE\_AMP\_EN}$.

When signal NONSECURE is inactive at a logic low, security logic circuit 40 functions as described above. NOR gates 46 and 47 operate as a latch. This latch has two inputs to reset it to the first state, namely the first and second inputs of NOR gate 46. The first input corresponds to the condition in which CPU 21 makes an instruction fetch to ROM 24, i.e., signals $\overline{ROM\ ADDRESS\ SELECT}$ and $\overline{LIR}$ are both active at a logic low which causes the output of NOR gate 43 to be at a logic high and to reset the latch. The second input corresponds to the condition in which there is an interrupt or exception, i.e., one of signals INTERRUPT and RESET is active at a logic high, which forces the output of NOR gate 41 to a logic low and the output of inverter 42 to a logic high causing a reset of the latch. The first state is represented by a logic low on the output of NOR gate 46 and a logic high on the output of NOR gate 47. This logic high causes the output of OR gate 48 to be a logic high, which causes NAND gate 49 to function as an inverter and signal $\overline{ROM\ ADDRESS\ SELECT}$ is twice inverted and provided as signal $\overline{ROM\_SENSE\_AMP\_EN}$.

The second input of NOR gate 47 functions as a set input terminal of the latch which sets it to the second state. When in the second state, the output of NOR gate 46 is at a logic high and the output of NOR gate 47 is at a logic low. This forces the output of OR gate 48 to be a logic low, which causes the output of NAND gate 49 to be held at a logic high. This corresponds to the inactive state of signal $\overline{ROM\_SENSE\_AMP\_EN}$ and when in this state, accesses to ROM 24 are disabled. There are three conditions which cause the latch to be set to the second state. First, $\overline{LIR}$ must be active at a logic low to indicate an instruction fetch. Second, signal $\overline{ROM\ ADDRESS\ SELECT}$ must be inactive at a logic high, which after being inverted by inverter 44 makes the third input of NOR gate 45 a logic low. Finally, no exception can be present, i.e., signals INTERRUPT and RESET must both be inactive at a logic low, causing the output of NOR gate 41 to be a logic high and the output of inverter 42 to be a logic low.

It should be apparent that other particular logic circuits which perform the basic logic function may be used. For example, in other embodiments some logic signals may be active at different logic states, requiring a change in logic gates. However, by the use of signal $\overline{LIR}$, security logic circuit 40 implements the security mechanism efficiently and without the need to provide the program counter value to the periphery of CPU 21 and to perform a multi-bit comparison.

While the invention has been described in the context of a preferred embodiment, it will be apparent to those skilled in the art that the present invention may be modified in numerous ways and may assume many embodiments other than that specifically set out and described above. For example, the illustrated ROM could be replaced with different types of nonvolatile memory including programmable ROM (PROM), erasable PROM (EPROM), electrically erasable PROM (EEPROM), flash EEPROM, and the like. Accordingly, it is intended by the appended claims to cover all modifications of the invention which fall within the true spirit and scope of the invention.

We claim:

1. A microcontroller which prevents reading of internal memory by an external program, comprising:

a central processing unit coupled to address and data buses for fetching instructions and for accessing data in response to executing said instructions, said central processing unit providing a load instruction register signal while fetching instructions;

a nonvolatile memory coupled to said address and data buses and having a control input for receiving an enable signal, said nonvolatile memory allowing accesses to data elements stored therein when said enable signal is active;

an expansion port for coupling said address and data buses to an external bus; and a security logic circuit coupled to said central processing unit and to said nonvolatile memory, which is set to a first state when a first address within an address range of said nonvolatile memory is conducted on said address bus while said load instruction register signal is active, and is reset to a second state when a second address which is not within said address range of said nonvolatile memory is conducted on said address bus while said load instruction register signal is active, said security logic circuit activating said enable signal to said nonvolatile memory while in said first state but not while in said second state.

2. The microcontroller (20) of claim 1 further comprising a configuration register (23) for storing at least one bit indicative of a security mode of said microcontroller (20), wherein when said at least one bit is in a predetermined logic state, said configuration register activates a nonsecure control signal and wherein said security logic circuit (40) always allows accesses by said central processing unit (21) to said nonvolatile memory (24) when said nonsecure control signal is active.

3. The microcontroller of claim 1 wherein said security logic circuit comprises:

a first logic gate having a first input for receiving said load instruction register signal, a second input for receiving a first nonvolatile memory select signal, and an output;

a second logic gate having a first input terminal for receiving a second nonvolatile memory select signal, a second input for receiving said load instruction register signal, and an output; and a latch having a set input terminal coupled to said output of said first logic gate, a reset terminal coupled to said output of said second logic gate, and an output, said security logic circuit providing said enable signal in response to said output of said latch.

4. The microcontroller of claim 3 wherein said latch further has a second reset input terminal responsive to an exception signal.

5. The microcontroller of claim 4 wherein said security logic circuit further comprises an exception logic circuit having a first input for receiving a reset input signal, a second input for receiving an interrupt signal, and an output for providing said exception signal.

6. The microcontroller of claim 3 further comprising a configuration register for storing at least one bit indicative of a security mode of said microcontroller, said configuration register activating a nonsecure control signal when in a first mode and keeping said nonsecure control signal in an inactive state when in a second mode, wherein said security logic circuit always allows accesses by said central processing unit to said nonvolatile memory when said nonsecure control signal is active.

7. The microcontroller of claim 6 wherein said security logic circuit further comprises a bypass logic circuit having a first input coupled to said output of said latch, a second input coupled to said configuration register for receiving said nonsecure control signal, and an output for providing said enable signal.

8. The microcontroller of claim 1 wherein said nonvolatile memory comprises a read-only memory (ROM).

9. The microcontroller of claim 1 wherein said nonvolatile memory comprises:

a nonvolatile memory select decoder having an input coupled to said address bus, and an output for providing a nonvolatile memory select signal;

a row decoder having an input coupled to said address bus, and an output;

an array of nonvolatile memory cells coupled to said output of said row decoder and responsive thereto for providing a first predetermined number of logic signals representative of contents of a like predetermined number of memory cells selected by said row decoder;

a column decoder having an input coupled to said address bus and coupled to said array of nonvolatile memory cells to select a second predetermined number of memory cells from among said first predetermined number of memory cells; and a plurality of sense amplifiers corresponding to said second predetermined number of memory cells for sensing logic levels thereof and providing a like predetermined number of signals to said data bus, wherein said plurality of sense amplifiers are enabled by said enable signal.

10. A microcontroller which prevents reading of internal memory by an external program, comprising:

a central processing unit coupled to address and data buses for fetching instructions and for accessing data in response to executing said instructions, said central processing unit providing a load instruction register signal while fetching instructions;

a nonvolatile memory coupled to said address and data buses and having a control input for receiving an enable signal, said nonvolatile memory allowing accesses to data elements stored therein when said enable signal is active;

an expansion port for coupling said address and data buses to an external bus; and security logic means coupled to said central processing unit and to said nonvolatile memory, for activating said enable signal when a latch means thereof is in a first state but keeping said enable signal inactive when said latch means is in a second state said latch means for being set to said first state when a first address within an address range of said nonvolatile memory is conducted on said address bus while said load instruction register signal is active, and for being reset to said second state when a second address which is not within said address range of said nonvolatile memory is conducted on said address bus while said load instruction register signal is active.

11. The microcontroller of claim 10 wherein said latch means further comprises a first logic gate having a first input for receiving said load instruction register signal, a second input for receiving a first nonvolatile memory select signal, and an output coupled to said latch means for causing said latch means to be set to said second state.

12. The microcontroller of claim 11 wherein said latch means further comprises a second logic gate having a first input for receiving a second nonvolatile memory select signal, a second input for receiving said load instruction register signal, and an output coupled to said latch means for causing said latch means to be reset to said first state.

13. The microcontroller of claim 12 wherein said latch means comprises:

a first NOR gate having a first input terminal coupled to said output of said second logic gate, a second input terminal, and an output terminal; and a second NOR gate having a first input terminal coupled to said output of said first logic gate, a second input terminal coupled to said output terminal of said first NOR gate, and an output terminal coupled to said second input terminal of said first NOR gate, said security logic means providing said enable signal in response to an output signal at said output terminal of said second NOR gate.

14. The microcontroller of claim 13 wherein said first NOR gate further has a second reset input terminal responsive to an exception signal.

15. The microcontroller of claim 14 wherein said security logic means further comprises an exception logic circuit having a first input for receiving a reset input signal, a second input for receiving an interrupt signal, and an output for providing said exception signal.

16. The microcontroller of claim 10 wherein said nonvolatile memory comprises a read-only memory (ROM).

17. The microcontroller of claim 16 wherein said nonvolatile memory comprises:

a nonvolatile memory select decoder having an input coupled to said address bus, and an output for providing a nonvolatile memory select signal;

a row decoder having an input coupled to said address bus, and an output;

an array of nonvolatile memory cells coupled to said output of said row decoder and responsive thereto for providing a first predetermined number of logic signals representative of contents of a like predetermined number of memory cells selected by said row decoder;

a column decoder having an input coupled to said address bus and coupled to said array of nonvolatile memory cells to select a second predetermined number of memory cells from among said first predetermined number of memory cells; and a plurality of sense amplifiers corresponding to said second predetermined number of memory cells for sensing logic levels thereof and providing a like predetermined number of signals to said data bus, wherein said plurality of sense amplifiers are enabled by said enable signal.

* * * * *